US011279392B2

(12) United States Patent
Sugiura et al.

(10) Patent No.: US 11,279,392 B2
(45) Date of Patent: Mar. 22, 2022

(54) STEERING COLUMN DEVICE

(71) Applicants: JTEKT CORPORATION, Osaka (JP); FUJI KIKO CO., LTD., Kosai (JP)

(72) Inventors: Tomonori Sugiura, Yamatokoriyama (JP); Kentaro Kikuiri, Kashihara (JP); Yuta Kiguchi, Hamamatsu (JP); Kota Higuchi, Hamamatsu (JP)

(73) Assignees: JTEKT CORPORATION, Osaka (JP); FUJI KIKO CO., LTD., Kosai (JP)

( * ) Notice: Subject to any disclaimer, the term of this patent is extended or adjusted under 35 U.S.C. 154(b) by 0 days.

(21) Appl. No.: 17/016,696

(22) Filed: Sep. 10, 2020

(65) Prior Publication Data

US 2021/0078626 A1    Mar. 18, 2021

(30) Foreign Application Priority Data

Sep. 13, 2019  (JP) .............................. JP2019-166944

(51) Int. Cl.
   *B62D 1/18*     (2006.01)
   *B60R 25/021*   (2013.01)
   *B62D 1/187*    (2006.01)

(52) U.S. Cl.
   CPC ............ *B62D 1/18* (2013.01); *B60R 25/0211* (2013.01); *B62D 1/187* (2013.01)

(58) Field of Classification Search
   CPC ...................................................... B62D 1/184
   See application file for complete search history.

(56) References Cited

U.S. PATENT DOCUMENTS

| 5,320,384 | A | * | 6/1994 | Arnold | .................. | B62D 1/195 |
| | | | | | | 280/777 |
| 5,409,261 | A | * | 4/1995 | Yamaguchi | ............ | B62D 1/184 |
| | | | | | | 280/775 |
| 6,189,405 | B1 | * | 2/2001 | Yazane | .................. | B62D 1/184 |
| | | | | | | 180/444 |
| 7,401,814 | B2 | * | 7/2008 | Yasuhara | ............... | B62D 1/195 |
| | | | | | | 280/775 |
| 9,415,794 | B2 | * | 8/2016 | Nagasawa | .............. | B62D 1/184 |
| 9,463,773 | B2 | * | 10/2016 | Matsushima | .......... | B60R 25/02 |
| 11,034,379 | B2 | * | 6/2021 | Park | ........................ | B62D 1/19 |

(Continued)

FOREIGN PATENT DOCUMENTS

| EP | 3 401 188 A1 | 11/2018 | | |
| JP | 2006306263 A | * | 11/2006 | ............. B62D 1/184 |

(Continued)

OTHER PUBLICATIONS

Feb. 8, 2021 Extended Search Report issued in European Patent Application No. 20194069.9.

*Primary Examiner* — Nicole T Verley
(74) *Attorney, Agent, or Firm* — Oliff PLC

(57) ABSTRACT

A steering column device includes a cylindrical inner tube, and a cylindrical outer tube which is fixed to the inner tube by being externally fitted to slide in an axial direction of the inner tube and being elastically reduced in diameter, wherein the outer tube is configured to have a first slit and a second slit to be reduced in diameter. A stress alleviation portion is provided at the second slit. A contour shape of the stress alleviation portion is set to include an elliptic arc-shaped portion of which a direction of a major axis is a direction intersecting the second slit.

5 Claims, 4 Drawing Sheets

(56) References Cited

U.S. PATENT DOCUMENTS

| | | | | |
|---|---|---|---|---|
| 2002/0171235 | A1* | 11/2002 | Riefe | B62D 1/184 |
| | | | | 280/775 |
| 2005/0093283 | A1* | 5/2005 | Yamada | B62D 1/184 |
| | | | | 280/775 |
| 2007/0234845 | A1* | 10/2007 | Gist | B62D 1/184 |
| | | | | 74/569 |
| 2009/0038428 | A1* | 2/2009 | Abe | B21D 26/023 |
| | | | | 74/492 |
| 2010/0000366 | A1* | 1/2010 | Nomura | B62D 1/185 |
| | | | | 74/493 |
| 2013/0205933 | A1* | 8/2013 | Moriyama | B62D 1/184 |
| | | | | 74/493 |
| 2015/0107398 | A1* | 4/2015 | Nagasawa | B22D 19/16 |
| | | | | 74/493 |
| 2015/0122075 | A1* | 5/2015 | Mihara | B62D 1/184 |
| | | | | 74/493 |
| 2018/0179820 | A1* | 6/2018 | Mora | E06C 1/12 |
| 2019/0185042 | A1* | 6/2019 | Lee | B62D 1/06 |
| 2020/0189642 | A1* | 6/2020 | Sugishita | B60R 25/021 |
| 2020/0233205 | A1* | 7/2020 | Konno | G02B 26/0858 |
| 2020/0276656 | A1* | 9/2020 | Holliday | B23C 3/28 |
| 2020/0284299 | A1* | 9/2020 | Moriyama | F16D 3/387 |
| 2020/0411457 | A1* | 12/2020 | Liu | H01L 24/03 |

FOREIGN PATENT DOCUMENTS

| | | | | |
|---|---|---|---|---|
| JP | 2009-006847 A | | 1/2009 | |
| JP | 2020111110 A | * | 7/2020 | |
| WO | WO-2006011378 A1 | * | 2/2006 | B62D 1/184 |

* cited by examiner

STEERING COLUMN DEVICE

CROSS-REFERENCE TO RELATED APPLICATION

This application claims priority to Japanese Patent Application No. 2019-166944 filed on Sep. 13, 2019, incorporated herein by reference in its entirety.

BACKGROUND

1. Technical Field

The present disclosure relates to a steering column device.

2. Description of Related Art

Conventionally, there is a steering column which rotatably supports a steering shaft of a vehicle. For example, a steering column of Japanese Unexamined Patent Application Publication No. 2009-6847 (JP 2009-6847 A) has a double pipe structure including an inner column and an outer column. A first slit which extends along an axis of the outer column and a second slit which is continuous with the first slit and extends in a circumferential direction of the outer column are provided in the outer column. Further, a pair of clamp portions which face each other with the first slit interposed therebetween is provided on the outer column. These clamp portions are sandwiched by column brackets fixed to a vehicle body. The inner column is tightened by reducing a diameter of the outer column due to elastic deformation of the clamp portions in directions in which they approach each other through an operation of a clamp device provided on the column bracket. Thus, relative movement between the inner column and the outer column in an axial direction is restricted.

SUMMARY

According to the steering column of JP 2009-6847 A, a rigidity when the diameter of the outer column is reduced is reduced by providing the first slit and the second slit in the outer column. A force required to reduce the diameter of the outer column and thus a force to operate the clamp device can be reduced by an amount that the rigidity of the outer column is reduced. Accordingly, operability of the clamp device is ensured.

However, when the diameter of the outer column is reduced, stress is concentrated on a distal end portion of the second slit. To alleviate the stress concentration at the distal end portion, a stress concentration alleviating portion is provided at the distal end portion of the second slit. The stress concentration alleviating portion opens in a circular shape having a diameter larger than a width of a portion of the second slit up to the distal end portion. A curvature of the distal end portion of the second slit becomes smaller by setting a diameter of the stress concentration alleviating portion to a value larger than the width of the portion of the second slit up to the distal end portion. Therefore, when the diameter of the outer column is reduced, the stress concentration on the distal end portion of the second slit is alleviated.

However, in the steering column of JP 2009-6847 A, the following may occur. For example, when a steering wheel is operated while rotation of a steering shaft is restricted by a steering lock device, a twisting force around an axis thereof is applied to the outer column. In this case, the stress may still be concentrated on the distal end portion of the second slit including the circular stress concentration alleviating portion.

The present disclosure provides a steering column device which is able to more appropriately alleviate stress concentration when a twisting force is applied to an outer tube.

A steering column device according to a first aspect of the present disclosure is a steering column device which rotatably supports a steering shaft. The steering column device includes a cylindrical inner tube, and a cylindrical outer tube which is fixed to the inner tube by being externally fitted to slide in an axial direction of the inner tube and being elastically reduced in diameter. The outer tube is configured to have a first slit which extends in an axial direction of the outer tube and a second slit which is continuous with the first slit and extends in a direction intersecting the first slit to be reduced in diameter. A stress alleviation portion which opens to have a width longer than a width up to an end portion of the second slit on a side opposite to the first slit is provided at the end portion. A contour shape of the stress alleviation portion is set to include an elliptic arc-shaped portion of which a direction of a major axis is a direction intersecting the second slit.

With such a configuration, it is possible to make a curvature of the end portion of the second slit smaller in a limited space by setting the contour shape of the end portion of the second slit to include the elliptic arc-shaped portion of which the direction of the major axis is the direction intersecting the second slit. Therefore, when a twisting force is applied to the outer tube for some reason, it is possible to more appropriately suppress stress concentration on the end portion of the second slit in the outer tube.

In the aspect, an opening portion into which an accessory component is inserted may be provided in the outer tube at a distance from the stress alleviation portion in the axial direction of the outer tube, and the stress alleviation portion may extend toward a side opposite to the opening portion in the axial direction of the outer tube.

With such a configuration, a rigidity between the second slit and the opening portion of the outer tube can be easily ensured as compared with a case in which the stress alleviation portion extends toward the opening portion side in the axial direction of the outer tube.

In the aspect, the accessory component may be a lock member which engages with a part of the steering shaft and restricts rotation of the steering shaft.

With such a configuration, when a torque is applied to the steering shaft while the rotation of the steering shaft is restricted by the lock member, a twisting force is applied to the outer tube. It is possible to appropriately suppress stress concentration on the end portion of the second slit by providing the stress alleviation portion at the end portion of the second slit.

In the aspect, the stress alleviation portion may extend toward both sides of a portion of the second slit up to the stress alleviation portion in a width direction. Such a configuration can be adopted when there is no opening portion near the second slit in the outer tube.

In the aspect, the stress alleviation portion and the portion of the second slit up to the stress alleviation portion may be smoothly continuous. With such a configuration, stress concentration on a peripheral edge portion of the second slit in the outer tube is suppressed.

In the aspect, a contour shape of the stress alleviation portion may be elliptical. It is conceivable to set the contour shape of the end portion of the second slit to a circular shape, and when it is assumed that the stress alleviation portions are provided in regions having the same size, a curvature of the elliptic arc in the direction of the major axis is smaller than the curvature of the arc. Therefore, it is possible to further reduce the curvature of the end portion of the second slit in a limited space by adopting the elliptical shape as the contour shape of the stress alleviation portion.

According to the steering column device of the present disclosure, it is possible to more appropriately alleviate stress concentration when a twisting force is applied to an outer tube.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
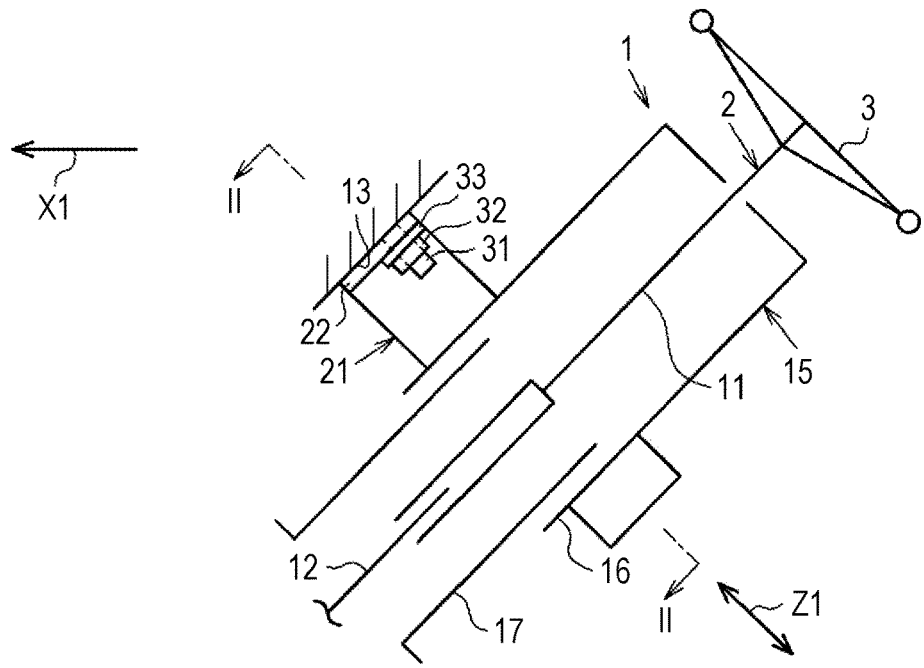
FIG. 1 is a schematic diagram showing a schematic configuration of an embodiment of a steering column device.

Hereinafter, an embodiment of a steering column device will be described. As shown in FIG. 1, the steering column device 1 rotatably supports a steering shaft 2. A steering wheel 3 is connected to a first end portion of the steering shaft 2. A second end portion of the steering shaft 2 engages with a rack shaft which extends in a right and left direction of a vehicle body via an intermediate shaft and a pinion shaft. Both end portions of the rack shaft are connected to right and left steered wheels via tie rods. A direction of steered wheels is changed in accordance with an operation of a steering wheel 3.

The steering shaft 2 has an outer shaft 11 and an inner shaft 12. The outer shaft 11 and the inner shaft 12 are connected to each other by, for example, spline connection. The outer shaft 11 and the inner shaft 12 are integrally rotatable and relatively movable in an axial direction of each other. The steering shaft 2 is provided obliquely to a forward and rearward direction X1 of a vehicle so that the steering wheel 3 is located on the upper side.

The steering column device 1 has a steering column 15 fixed to a fixed portion 13 such as a frame of a vehicle body.

The steering shaft 2 is inserted through the steering column 15. The steering shaft 2 is rotatably supported by the steering column 15 via a bearing.

The steering column 15 has an outer tube 16 and an inner tube 17. Each of the outer tube 16 and the inner tube 17 has a tubular shape. The outer tube 16 and the inner tube 17 are fitted to each other to be movable relative to each other in the axial direction of the steering shaft 2. The inner tube 17 is inserted into the outer tube 16 from the side opposite to the steering wheel 3. The outer tube 16 is fixed to the fixed portion 13 on the vehicle body side via a column bracket 21.

Figure 2:
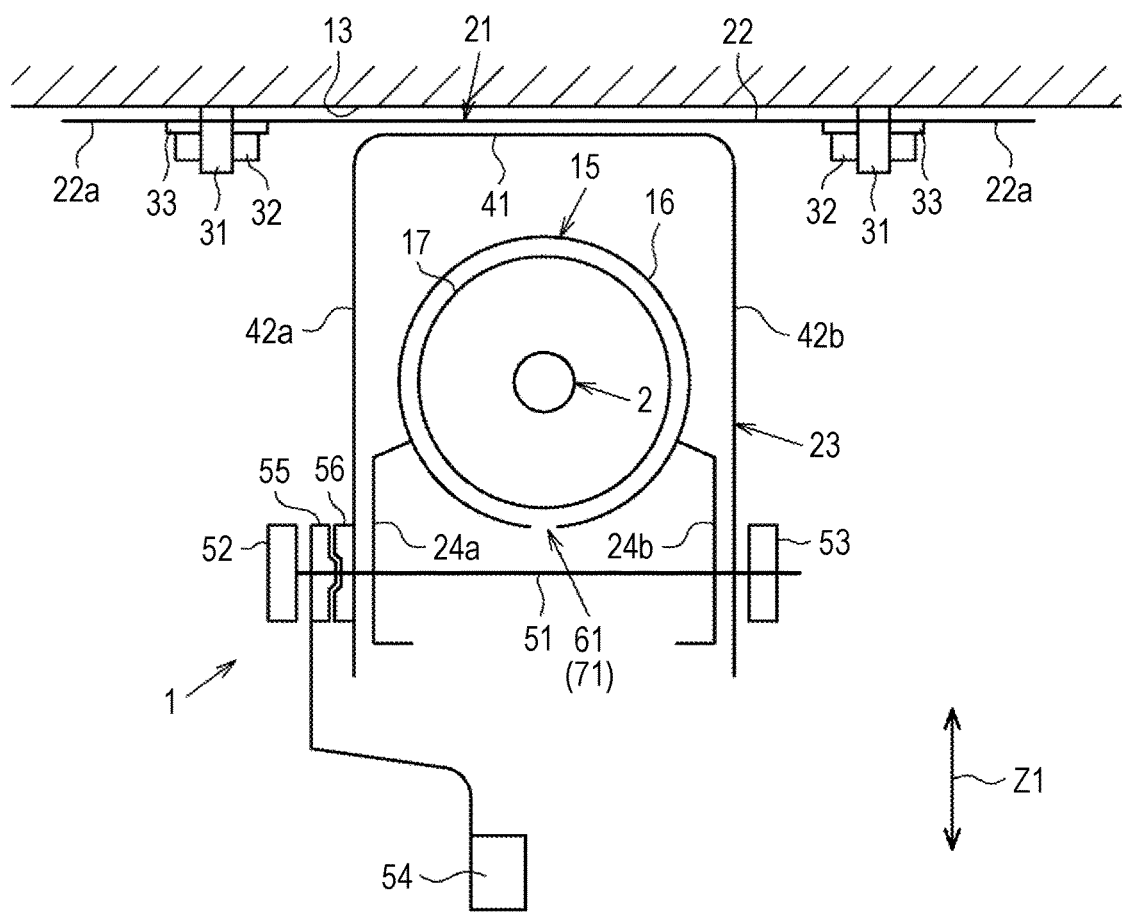
FIG. 2 is a schematic sectional view taken along line II-II in FIG. 1.

As shown in FIG. 2, the column bracket 21 has an upper bracket 22, a tilt bracket 23, and two clamp brackets 24a and 24b. The upper bracket 22 has a flat plate shape which extends in the right and left direction of the vehicle body (the right and left direction in FIG. 2). Mounting seats 22a are respectively provided at both ends of the upper bracket 22. The upper bracket 22 is fixed to the fixed portion 13 of the vehicle body through the mounting seats 22a and 22a. Specifically, it is as follows.

That is, two bolts 31 and 31 are provided on the fixed portion 13 to protrude therefrom. The bolts 31 and 31 extend so that an axial direction Z1 thereof intersects a vertical direction. The bolts 31 and 31 are provided one by one on the left side and the right side of the vehicle body with respect to the steering shaft 2 when seen in the axial direction of the steering shaft 2. The bolt 31 is a stud bolt having male threads on both ends thereof. A first end portion of the bolt 31 is screwed into the fixed portion 13. A second end portion of the bolt 31 passes through the mounting seat 22a. The mounting seat 22a is fixed to the fixed portion 13 by tightening a nut 32 on the second end portion of the bolt 31. A washer 33 is interposed between the nut 32 and the mounting seat 22a.

The tilt bracket 23 is fixed to the upper bracket 22. The tilt bracket 23 has a square U-shape which opens to the side opposite to the upper bracket 22. The tilt bracket 23 has a connecting plate 41 and two side plates 42a and 42b. The connecting plate 41 is fixed to a surface (a lower surface in FIG. 2) of the upper bracket 22 opposite to the fixed portion 13 of the vehicle body. The two side plates 42a and 42b are connected to both side edges of the connecting plate 41 in the right and left direction of the vehicle body when seen in the axial direction of the steering shaft 2. The two side plates 42a and 42b extend toward the side opposite to the fixed portion 13 of the vehicle body (downward in FIG. 2). Long holes which extend in the axial direction Z1 of the bolt 31 are provided in the two side plates 42a and 42b.

The two clamp brackets 24a and 24b are formed by bending a metal flat plate into a square U-shape. The two clamp brackets 24a and 24b are fixed to an outer peripheral surface of the outer tube 16. The two clamp brackets 24a and 24b extend toward the side opposite to the fixed portion 13 of the vehicle body (downward in FIG. 2). The two clamp brackets 24a and 24b are located inside the two side plates 42a and 42b of the tilt bracket 23 in the right and left direction of the vehicle body when seen in the axial direction of the steering shaft 2 and are held in a state in which they are in contact with the two side plates 42a and 42b. Long holes which extend in the axial direction of the steering shaft 2 are provided in the two clamp brackets 24a and 24b.

The tilt bracket 23 and the two clamp brackets 24a and 24b are connected via a tightening shaft 51 configured of a bolt. The two clamp brackets 24a and 24b are supported by the tightening shaft 51 so that their positions can be adjusted relative to the tilt bracket 23. The tightening shaft 51 extends in a direction intersecting the axial direction of the steering shaft 2 (the right and left direction in FIG. 2). The tightening shaft 51 passes through the long holes of the side plates 42*a* and 42*b* of the tilt bracket 23 and the long holes of the two clamp brackets 24*a* and 24*b*. A nut 53 is screwed into a tip end portion of the tightening shaft 51 having passed which is an end portion on the side opposite to a head portion 52. On the tightening shaft 51, a lever 54 is rotatably supported between the head portion 52 and one (the left side in FIG. 2) clamp bracket 24*a*.

A first cam 55 is integrally provided on a side surface of a base end portion of the lever 54 on the clamp bracket 24*a* side. Further, a second cam 56 is provided between the first cam 55 and one side plate 42*a* of the tilt bracket 23. The second cam 56 is provided in a state in which relative rotation with respect to the side plate 42*a* is restricted. A plurality of protruding portions is provided at intervals on a peripheral edge portion of a side surface of the first cam 55 on the second cam 56 side. A plurality of protruding portions is also provided at intervals on a peripheral edge portion of a side surface of the second cam 56 on the first cam 55 side. A rotational position of the first cam 55 is switched between a first rotational position and a second rotational position by a rotation operation of the lever 54. The first rotational position is a position at which the protruding portions of the first cam 55 engage between the protruding portions of the second cam 56. The second rotational position is a position at which the protruding portions of the first cam 55 ride on the protruding portions of the second cam 56.

When the rotational position of the first cam 55 is switched from the first rotational position to the second rotational position through the rotation operation of the lever 54, the first cam 55 rotates relatively with respect to the second cam 56, and the protruding portions of the first cam 55 ride on the protruding portions of the second cam 56 in accordance with such rotation. Since movement of the lever 54 in a direction along the tightening shaft 51 is restricted, the second cam 56 tries to move to the nut 53 side by an amount that the protruding portions of the first cam 55 ride on the protruding portions of the second cam 56. In accordance with this, the two side plates 42*a* and 42*b* of the tilt bracket 23 are elastically deformed in directions in which they approach each other and are thus pressed against the two clamp brackets 24*a* and 24*b* between the second cam 56 and the nut 53. Accordingly, the relative movement of the two clamp brackets 24*a* and 24*b* with respect to the tilt bracket 23 is restricted.

Further, the two clamp brackets 24*a* and 24*b* are elastically deformed in the directions in which they approach each other via the two side plates 42*a* and 42*b* of the tilt bracket 23. Here, a slit 61 is provided in a portion of the outer tube 16 between the two clamp brackets 24*a* and 24*b*. The slit 61 has a portion which extends from the first end portion to the second end portion in the axial direction of the outer tube 16. Therefore, the outer tube 16 is elastically deformed in such a manner that a gap between the slits 61 is narrowed by narrowing a gap between the two clamp brackets 24*a* and 24*b*. That is, the outer tube 16 is elastically deformed so that an inner diameter thereof becomes smaller, and thus tightens an outer peripheral surface of the inner tube 17. Accordingly, the relative movement of the outer tube 16 with respect to the inner tube 17 in the axial direction is restricted.

When a position of the steering wheel 3 is changed, the rotational position of the first cam 55 may be switched from the second rotational position to the first rotational position by the rotation operation of the lever 54. The tightening of the two side plates 42*a* and 42*b* of the tilt bracket 23 in the direction in which they approach each other and the tightening of the two clamp brackets 24*a* and 24*b* in the direction in which they approach each other are released by fitting the protruding portions of the first cam 55 between the protruding portions of the second cam 56. A distance between the two side plates 42*a* and 42*b* and a distance between the two clamp brackets 24*a*, 24*b* are respectively increased by elastically returning the two side plates 42*a* and 42*b* of the tilt bracket 23 and the two clamp brackets 24*a* and 24*b* to their original positions.

Accordingly, a force with which the two side plates 42*a* and 42*b* of the tilt bracket 23 sandwich the two clamp brackets 24*a* and 24*b* is weakened. Therefore, the outer tube 16 to which the two clamp brackets 24*a* and 24*b* are fixed can move relatively with respect to the tilt bracket 23 in the vertical direction. The position of the steering wheel 3 in the vertical direction can be adjusted by moving the steering wheel 3 in the vertical direction. Further, the outer tube 16 can move relatively with respect to the inner tube 17 in the axial direction by releasing the tightening of the inner tube 17 by the outer tube 16. The position of the steering wheel 3 in the axial direction can be adjusted by moving the steering wheel 3 in the axial direction.

Figure 3:
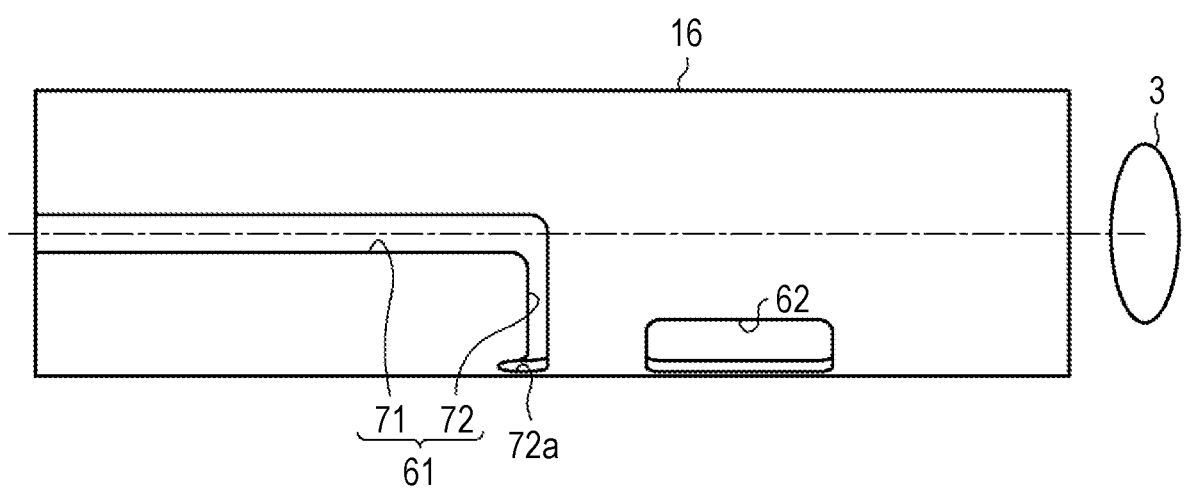
FIG. 3 is a front view of an outer tube according to an embodiment when seen from a side opposite to a fixed portion of a vehicle body.

Next, the outer tube 16 will be described in detail. As shown in FIG. 3, the slit 61 and a rectangular opening portion 62 are provided in a peripheral wall of the outer tube 16. The opening portion 62 is located between the slit 61 and an end portion (a right end portion in FIG. 3) of the outer tube 16 on the steering wheel 3 side in the axial direction.

Figure 4:
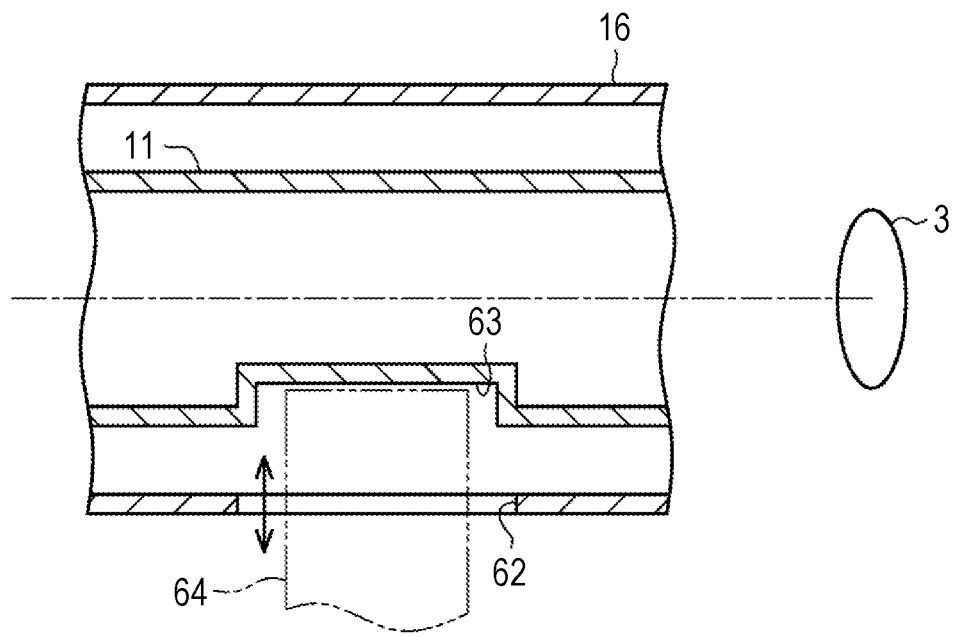
FIG. 4 is a sectional view of a main portion of a steering column device according to an embodiment cut along a plane which is coplanar/parallel to the longitudinal axis of the steering column.

As shown in FIG. 4, a lock recessed portion 63 is provided in a peripheral wall of the outer shaft 11. The lock recessed portion 63 extends in the axial direction of the outer shaft 11. A position of the lock recessed portion 63 of the outer shaft 11 and a position of the opening portion 62 of the outer tube 16 are aligned with each other in the axial direction of the outer shaft 11. Therefore, during one rotation of the outer shaft 11, a state in which the lock recessed portion 63 and the opening portion 62 are aligned with each other in a rotation direction of the outer shaft 11 is formed.

In the state in which the lock recessed portion 63 of the outer shaft 11 and the opening portion 62 of the outer tube 16 are aligned with each other in the rotation direction of the outer shaft 11, a lock member 64 of a steering lock device is inserted into the lock recessed portion 63 through the opening portion 62. The lock member 64 moves between a lock position and an unlock position, for example, in conjunction with an operation of an ignition key. The lock position is a position at which a tip end of the lock member 64 is inserted into the lock recessed portion 63 of the outer shaft 11 through the opening portion 62 of the outer tube 16. The unlock position is a position at which the tip end of the lock member 64 is pulled out of the lock recessed portion 63 or the opening portion 62.

When the ignition key is turned from an ON position of a vehicle power supply to the lock position, the lock member 64 moves from the unlock position to the lock position. When the steering shaft 2 is about to rotate through the operation of the steering wheel 3, an inner surface of the lock recessed portion 63 of the outer shaft 11 engages with the lock member 64. Thus, the rotation of the steering shaft 2 and thus the steering wheel 3 is restricted. On the other hand, when the ignition key is turned from the lock position to the ON position of the power supply, the lock member 64 moves from the lock position to the unlock position. Accordingly, the rotation of the steering wheel 3 is allowed.

As shown in FIG. 3, the slit 61 has a first slit 71 and a second slit 72. The first slit 71 and the second slit 72 are continuous with each other and have an L shape as a whole.

The first slit 71 extends in the axis of the outer tube 16. The first slit 71 is provided in a range from an end portion (a left end portion in FIG. 3) of the outer tube 16 opposite to the steering wheel 3 to the vicinity of a center of the outer tube 16 in the axial direction. The end portion of the first slit 71 opposite to the steering wheel 3 is open. The second slit 72 extends in a direction which intersects the first slit 71 starting from an end portion (a right end portion in FIG. 3) of the first slit 71 on the steering wheel 3 side, here, in a circumferential direction of the outer tube 16. In the axial direction of the outer tube 16, the second slit 72 and the opening portion 62 are adjacent to each other with a predetermined interval therebetween.

Figure 5:
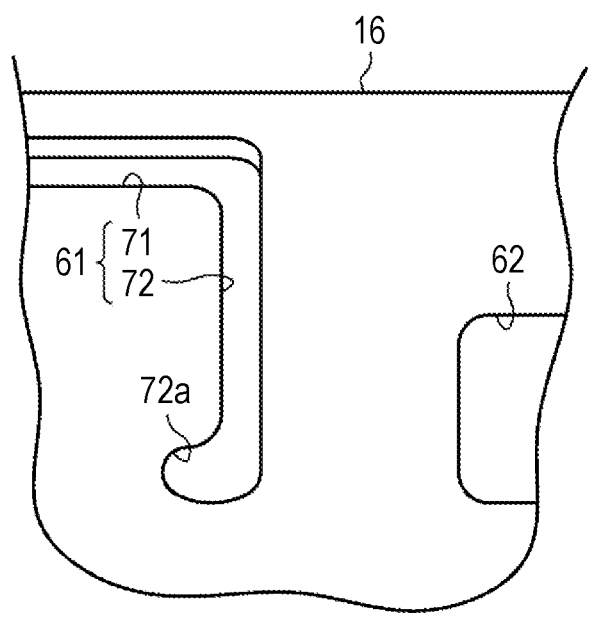
FIG. 5 is a side view showing a vicinity of a distal end of a slit of an outer tube according to an embodiment.

As shown in FIG. 5, a stress alleviation portion 72a is provided at an end portion of the second slit 72. The end portion of the second slit 72 is an end portion of the second slit 72 on the side opposite to the first slit 71. The stress alleviation portion 72a opens in an elliptical shape having a major axis longer than a width of a portion of the second slit 72 up to the stress alleviation portion 72a. The stress alleviation portion 72a extends in the axial direction of the outer tube 16 toward the side opposite to the opening portion 62 (the left side in FIG. 5). That is, the stress alleviation portion 72a is provided not to protrude to the opening portion 62 side (the right side in FIG. 5) based on the portion of the second slit 72 up to the stress alleviation portion 72a. The stress alleviation portion 72a and the portion of the second slit 72 up to the stress alleviation portion 72a are continuous with each other via a smooth curved surface.

Now, after the adjustment of the position of the steering wheel 3 is completed, the rotational position of the first cam 55 is switched from the first rotational position to the second rotational position by the rotation operation of the lever 54. In accordance with this operation, the two side plates 42a and 42b of the tilt bracket 23 are tightened in the directions in which they approach each other, and thus the relative movement of the two clamp brackets 24a and 24b with respect to the tilt bracket 23 is restricted. Further, a diameter of a portion of the outer tube 16 in which the slit 61 is provided is reduced to tighten the outer peripheral surface of the inner tube 17. Accordingly, the relative movement of the outer tube 16 with respect to the inner tube 17 in the axial direction is restricted.

Here, the slit 61 provided between the two clamp brackets 24a and 24b in the outer tube 16 has not only the first slit 71 which extends in the axial direction of the outer tube 16 but also the second slit 72 which extends in the circumferential direction of the outer tube 16. Therefore, a rigidity when the diameter of the portion of the outer tube 16 in which the slit 61 is provided is reduced becomes lower than that of the other portions. Since an operating force of the lever 54 required to reduce the diameter of the outer tube 16 becomes smaller, the operability of the lever 54 improves.

Next, the operation of the stress alleviation portion 72a will be described. When the ignition key is operated from the ON position of the vehicle power supply to the lock position, the lock member 64 is inserted into the lock recessed portion 63 of the outer shaft 11 through the opening portion 62 of the outer tube 16, and thus the rotation of the steering shaft 2 is restricted. In this state, for example, when the steering wheel 3 is intended to be operated, a twisting force is applied to the outer tube 16 via the portion in which the opening portion 62 is provided. The twisting force is transmitted to the slit 61 as a torque around the axis of the outer tube 16. At this time, stress may be concentrated on a tip end portion of the second slit 72 which is a portion of the outer tube 16 closest to the opening portion 62 in the slit 61 and extends in the circumferential direction of the outer tube 16.

In this regard, the elliptical stress alleviation portion 72a having a major axis longer than the width to the end portion is provided at the end portion of the second slit 72. That is, it is possible to further reduce a curvature of the end portion of the second slit 72 in a limited space by setting a contour shape of the end portion of the second slit 72 to include an elliptic arc-shaped portion in which a direction intersecting with the second slit 72 is a direction of a major axis thereof. Therefore, when a twisting force is applied to the outer tube 16, it becomes difficult for stress to be concentrated on the end portion of the second slit 72 including the stress alleviation portion 72a. Incidentally, as the curvature of the elliptic arc which is the contour shape of the end portion of the second slit 72 becomes smaller, in other words, a radius of curvature of the elliptic arc becomes larger, the stress concentration at the end portion of the second slit 72 is further alleviated.

Figure 6:
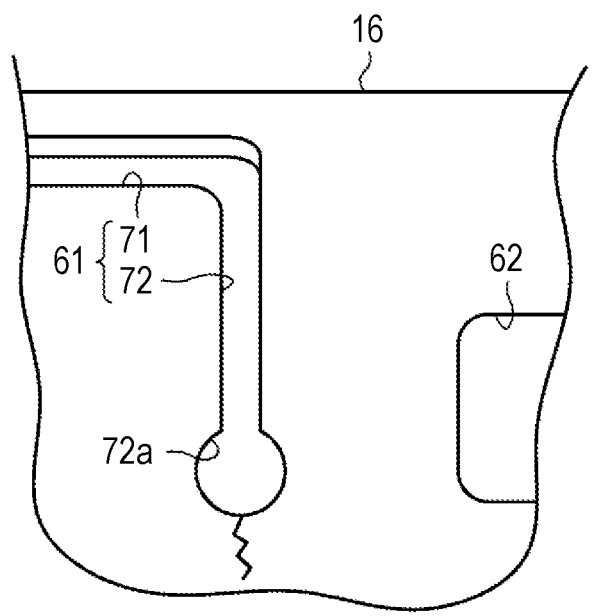
FIG. 6 is a side view showing a shape of a distal end of a slit of an outer tube according to a comparative example.

As shown as a comparative example in FIG. 6, it is also conceivable to set the contour shape of the end portion of the second slit 72, that is, the stress alleviation portion 72a to, for example, a circular shape having a diameter larger than the width of the portion of the second slit 72 up to the stress alleviation portion 72a.

However, when it is assumed that, for example, the circular stress alleviation portion 72a and the elliptical stress alleviation portion 72a are provided in regions having the same size, the curvature of the arc becomes larger than the curvature of the elliptic arc in the direction of the major axis. Therefore, although it may be different according to the diameter of the circular stress alleviation portion 72a, when the twisting force is applied to the outer tube 16, the stress may be still concentrated on the end portion of the second slit 72 including the circular stress alleviation portion 72a.

In order to further alleviate the stress concentration at the end portion of the second slit 72, the diameter of the circular stress alleviation portion 72a may be set to a larger value. However, as the diameter of the stress alleviation portion 72a is set to a larger value, an opening area of the stress alleviation portion 72a becomes wider, and thus the rigidity of the portion of the outer tube 16 in which the slit 61 is provided is reduced. Further, there is a limit to an increase in a size of the stress alleviation portion 72a due to the space limitation on the outer peripheral surface of the outer tube 16.

In this regard, it is possible to set the curvature of the end portion of the second slit 72 to be smaller in a limited space while suppressing an increase in the opening area of the stress alleviation portion 72a by setting the contour shape of the stress alleviation portion 72a to an elliptical shape.

Figure 7:
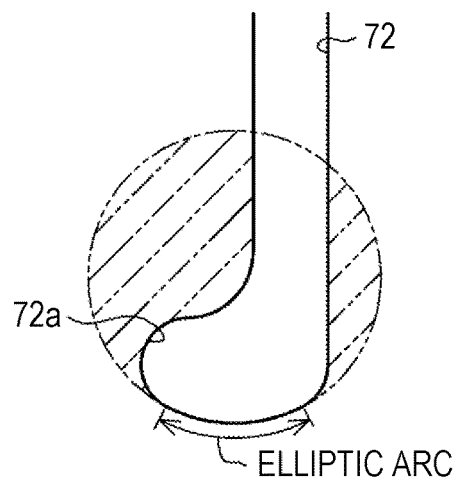
FIG. 7 is a side view showing a shape of a distal end of a slit of an outer tube according to an embodiment.

As shown by a two-dot chain line in FIG. 7, in the case in which a circular shape is adopted as the contour shape of the stress alleviation portion 72a, when it is intended to obtain a curvature similar to the curvature of the end portion of the second slit 72 obtained when the elliptical shape is adopted as the contour shape of the stress alleviation portion 72a, the opening area of the circular stress alleviation portion 72a is larger than the opening area of the elliptical stress alleviation portion 72a.

Therefore, it is possible to more effectively alleviate the stress concentration at the end portion of the second slit 72 while suppressing an increase in the opening area of the stress alleviation portion 72a by adopting an elliptical shape as the contour shape of the stress alleviation portion 72a.

In addition, the stress alleviation portion 72a extends toward the side opposite to the opening portion 62 in the axial direction of the outer tube 16. Therefore, the rigidity of the portion of the outer tube 16 between the second slit 72 and the opening portion 62 is ensured as compared with the case in which the stress alleviation portion 72a extends toward the opening portion 62 side.

Therefore, according to the embodiment, the following effects can be obtained. It is possible to further reduce the curvature of the end portion of the second slit 72 in a limited space by setting the contour shape of the end portion of the second slit 72 to include an elliptic arc-shaped portion having a direction intersecting the second slit 72 as the direction of the major axis. Therefore, when a twisting force is applied to the outer tube 16, it is possible to more appropriately suppress the stress concentration on the end portion of the second slit 72 in the outer tube 16.

Specifically, an elliptical shape is adopted as the contour shape of the stress alleviation portion 72a provided at the end portion of the second slit 72. It is conceivable to set the contour shape of the end portion of the second slit 72 to a circular shape, and for example, when it is assumed that the circular stress alleviation portion 72a and the elliptical stress alleviation portion 72a are provided in the regions having the same size, the curvature of the elliptic arc in the direction of the major axis is smaller than the curvature of the arc. Therefore, it is possible to further reduce the curvature of the end portion of the second slit 72 in a limited space by adopting the elliptical shape as the contour shape of the stress alleviation portion 72a. Therefore, when a twisting force is applied to the outer tube 16, it is possible to more effectively alleviate the stress concentration on the end portion of the second slit 72.

The stress alleviation portion 72a extends toward the side opposite to the opening portion 62 in the axial direction of the outer tube 16. Therefore, the rigidity of the portion of the outer tube 16 between the second slit 72 and the opening portion 62 can be ensured. A supporting rigidity of the steering shaft 2 in the outer tube 16 is also ensured.

The stress alleviation portion 72a and the portion of the second slit 72 up to the stress alleviation portion 72a are continuous via a smooth curved surface. Therefore, it is possible to suppress the stress concentration on the peripheral edge portion of the end portion of the second slit 72.

The embodiment may be modified as follows. A plurality of lock recessed portions 63 may be provided at predetermined intervals in the outer shaft 11 in the circumferential direction thereof. The rotation of the steering shaft 2 is restricted by inserting the lock member 64 of the steering lock device into any one of the lock recessed portions 63 through the opening portion 62 of the outer tube 16.

As a portion into which the lock member 64 of the steering lock device is inserted, a hole passing through a peripheral wall of the outer shaft 11 may be adopted instead of the lock recessed portion 63. In the embodiment, although the second slit 72 extends in the circumferential direction of the outer tube 16 to be orthogonal to the first slit 71, the second slit 72 may be provided to intersect the first slit 71 at a predetermined acute angle or obtuse angle.

Figure 8:
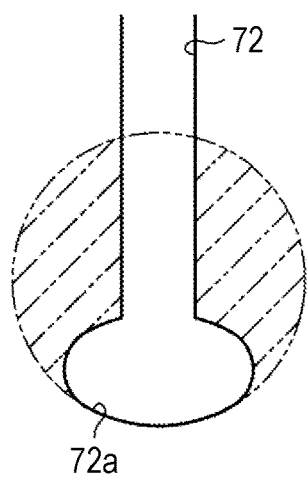
FIG. 8 is a side view of a main portion showing a shape of a distal end of a slit of an outer tube according to another embodiment.
Figure 9:
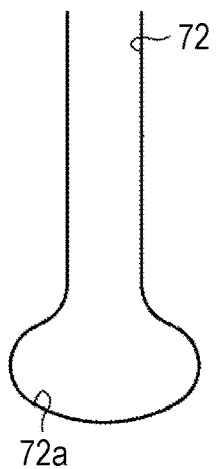
FIG. 9 is a side view of the main portion showing the shape of the distal end of the slit of the outer tube according to another embodiment.

The steering lock device may be not provided at the outer tube 16 according to use of a product, or the like. In this case, it is possible to adopt a configuration in which the opening portion 62 is omitted as the outer tube 16. Even when the configuration is adopted, a twisting force may be applied to the outer tube 16 for some reason. In addition, when the configuration in which the opening portion 62 is omitted is adopted as the outer tube 16, as shown in FIG. 8, an elliptical stress alleviation portion 72a may be provided to protrude to both sides of the portion of the second slit 72 up to the stress alleviation portion 72a. In this case, as shown in FIG. 9, the elliptical stress alleviation portion 72a and a main portion of the second slit 72 may be continuous with a smooth curve. Even in this case, the same effect in the above embodiment can be obtained.

An opening portion for inserting another accessory member such as a wire harness may be provided at a position near the second slit 72 in the outer tube 16, instead of the opening portion 62 for inserting the lock member 64.

The contour shape of the stress alleviation portion 72a is not limited to the elliptical shape. The contour shape of the stress alleviation portion 72a may be set to include an elliptic arc-shaped portion of which a direction of a major axis is a direction intersecting the second slit 72.

What is claimed is:

1. A steering column device which rotatably supports a steering shaft, comprising:
    a cylindrical inner tube; and
    a cylindrical outer tube which is fixed to the inner tube and configured to slide in an axial direction of the inner tube and be elastically reduced in diameter, wherein
    the outer tube is configured to have
        a first slit which extends in an axial direction of the outer tube and a second slit which is continuous with the first slit and extends in a direction intersecting the first slit,
        a stress alleviation portion provided at a first end portion of the second slit opposite to a second end portion of the second slit at which the first slit is provided, the stress alleviation portion opening from the second slit to have a width longer in the axial direction of the outer tube than a width of the first end portion of the second slit in the axial direction of the outer tube, and
        an opening portion, into which an accessory component is inserted, provided at a distance from the stress alleviation portion in the axial direction of the outer tube, the opening portion being disposed separated from the second slit and overlapping with the second slit in the axial direction of the outer tube,
    a contour shape of the stress alleviation portion is set to include an elliptic arc-shaped portion of which a direction of a major axis is a direction intersecting the second slit, and
    the stress alleviation portion extends toward a side opposite to the opening portion in the axial direction of the outer tube.

2. The steering column device according to claim 1, wherein the accessory component is a lock member which engages with a part of the steering shaft and restricts rotation of the steering shaft.

3. The steering column device according to claim 1, wherein
    the outer tube includes
        a first face defining a first side of the second slit at the first end portion of the second slit, the first face facing in a first direction parallel to the axial direction of the outer tube, and
        a second face defining a second side of the second slit at the first end portion of the second slit, the second face facing in a second direction parallel to the axial direction of the outer tube opposite to the first direction, and
    the stress alleviation portion extends (i) beyond the first side of the second slit at the first end portion of the second slit in the second direction and (ii) beyond the second side of the second slit at the first end portion of the second slit in the first direction.

4. The steering column device according to claim 1, wherein the stress alleviation portion and the first end portion of the second slit up are smoothly continuous.

5. The steering column device according to claim 1, wherein a contour shape of the stress alleviation portion is elliptical.

* * * * *